Dec. 15, 1953 A. B. MILLER 2,662,377
POWER BOOST CONTROL DEVICE
Filed Nov. 29, 1951 2 Sheets-Sheet 1

INVENTOR.
ALTON B. MILLER
BY
G. A. Gust
ATTORNEY

Dec. 15, 1953

A. B. MILLER 2,662,377

POWER BOOST CONTROL DEVICE

Filed Nov. 29, 1951

INVENTOR.
ALTON B. MILLER
BY
G. A. Gust
ATTORNEY

Patented Dec. 15, 1953

2,662,377

UNITED STATES PATENT OFFICE 2,662,377

POWER BOOST CONTROL DEVICE

Alton B. Miller, South Bend, Ind., assignor to Bendix Aviation Corporation, South Bend, Ind., a corporation of Delaware Application November 29, 1951, Serial No. 258,777

4 Claims. (Cl. 60—54.6)

The present invention relates to a power operated booster arranged to control the flow of fluid under pressure for operating a motor which performs useful work. In particular, the present invention relates to a power-assisted master cylinder for use in a hydraulic brake system.

A principal object of this invention is to provide a power boost control device which is devised to develop fluid pressure in response to manual operation, but which will prevent the development of a fluid pressure which exceeds a predetermined value.

A further object of this invention is to provide a power boost control device which is relatively simple and light weight in construction and is reliable in operation. This object has particular importance in the design of hydraulic systems for aircraft where reliability and weight have prime consideration.

Other objects and advantages of the invention will become apparent in the following description, reference being had therein to the accompanying drawing, in which.

The present invention constitutes an improvement over the construction of Stryker Patent No. 2,569,028, and reference may be had thereto for details of design and construction which may be directly utilized in understanding the principles of the present invention.

Figure 1:
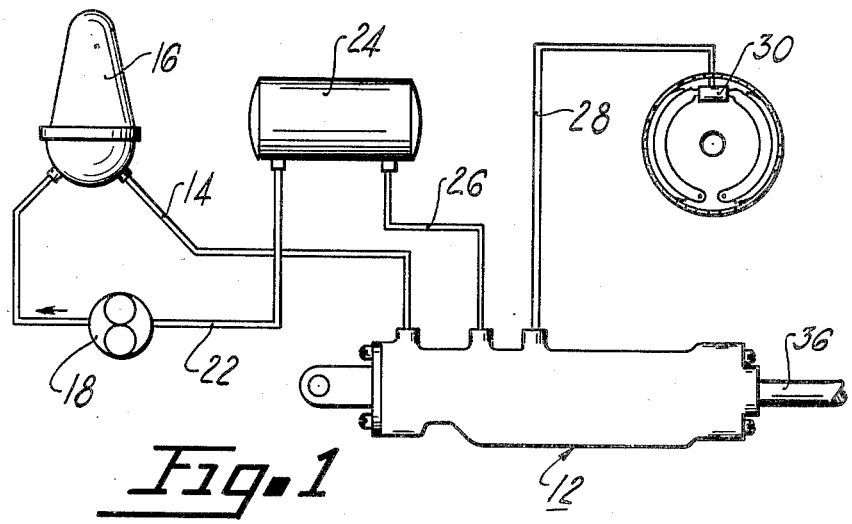
Figure 1 is a diagrammatic illustration of a fluid pressure system incorporating an embodiment of the present invention.
Figure 3:
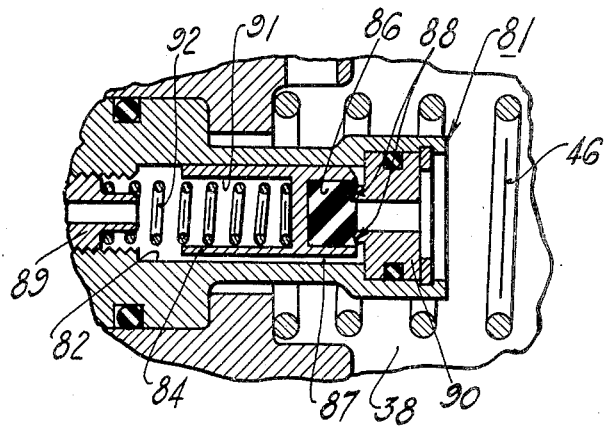
Figure 3 is an enlarged fragmental section taken from Figure 2.

The fluid pressure control device, or pressure booster as it may be called, is generally indicated in Figure 1 by the reference number 12. As shown in Figure 1, a conduit 14 connects a port of the device 12 to a source of pressure liquid such as the accumulator 16, the accumulator being supplied with liquid under pressure by a pump 18, and the inlet side of which is connected by conduit 22 to a reservoir 24 which provides a supply of liquid for the system. The reservoir 24 is connected by means of a conduit 26 to a second or exhaust port provided in the device 12, and a third port in said device is connected by means of a conduit 28 to a motor 30, which is arranged to operate the brake, or other work-performing device.

Figure 2:
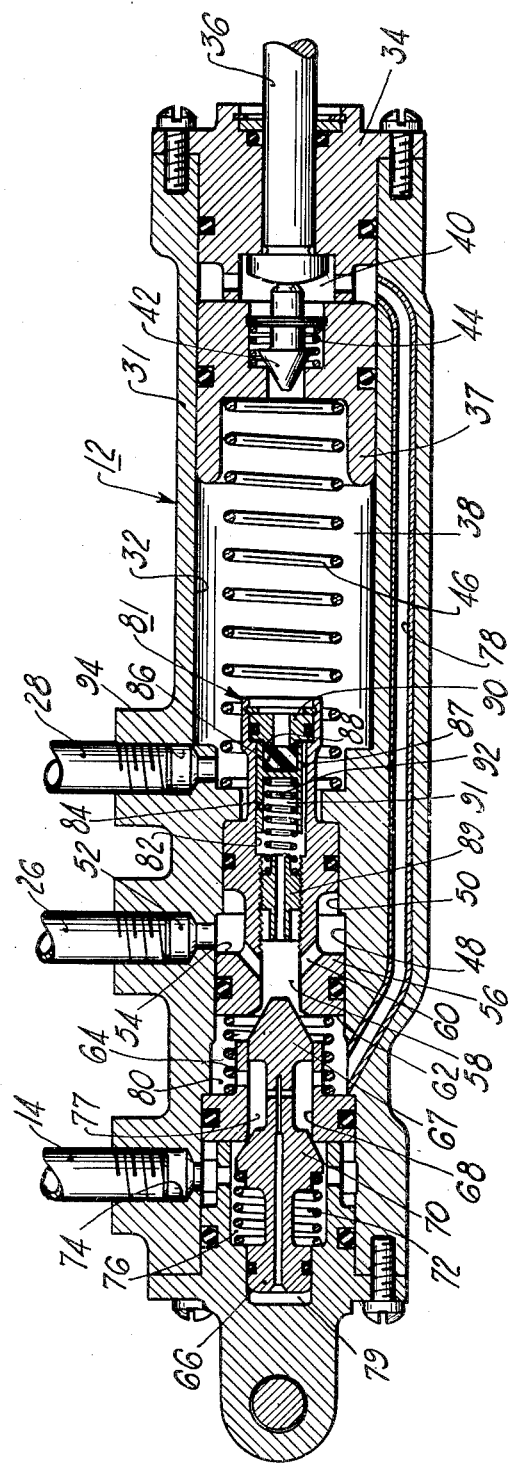
Figure 2 is a sectional view showing the details of said embodiment.

The device 12 may be said, broadly, to consist of a limited pressure master cylinder and a hydraulically operated power control valve. In Figure 2, it is seen that a casing 31 has a uniform diameter bore 32 in its right end which is closed by means of a plug 34. A push rod 36 for operating the device 12 is reciprocably projected through plug 34 for operative engagement with an actuating piston 37 which separates first and second variable volume chambers 38 and 40, respectively. This piston 37 is provided with a central opening which is controlled by means of a valve 42, this valve being biased to its opened position by a spring 44. By moving the operating rod 36 toward the left, the valve 42 will be seated to close the piston opening and to transfer the force of the rod 36 to the piston 37. A compression spring 46 is arranged in the chamber 38 in such a manner as to urge the piston 37 to the right in opposition to the leftward movement of the rod 36.

The left-hand end of the device 12 is provided with a stepped diameter bore having a large diameter 48 and a smaller diameter 50. A stepped diameter piston 56 is reciprocably received in the stepped diameter bore, and has a peripheral chamber 54 which communicates with exhaust port 52 and conduit 26. This chamber 54 also communicates with a coaxial passage 58 in the piston 56 by means of radial passages 60. The large diameter end 62 of piston 56 is acted upon by a spring 64 which tends to drive piston 56 toward the right. This spring 64 bears at its left-hand end on parts which may be considered for all practical purposes as being integral with the casing 31.

An actuating valve 66 is reciprocably carried in suitably sized bores in the left-hand end of the casing 31 with the conical head 67 positioned to control the opening and closing of the coaxial passage 58 of piston 56. The bore 68 in which the head 67 may reciprocate may also be considered as a fluid-conducting passage which is controlled by a valve 70 located intermediate the ends of actuating valve 66. A spring 72 acts to force valve 66 to its extreme right-hand position as illustrated.

The chamber 76 defined at the left or rear of the valve 70 is arranged for communication with a fluid pressure inlet port 74 which may be connected to the accumulator conduit 14. The annular chamber or space 77 between the two valves 67 and 70 is in constant communication with the chamber 79 to the rear of the valve 66 for providing a nearly balanced condition to facilitate operation of the valve 66.

A conduit 78, shown as being cast into the wall of casing 31, provides communication between the second chamber 40 and the third chamber 80 located at the rear of the large diameter end 62 of the piston 56.

The forward or small diameter end of the piston 56 is provided with a pressure-limiting means generally indicated by reference numeral 81 which comprises a bore 82, collinear with passage 58, arranged to reciprocably receive a cylindrical valve support 84. The right end of valve support 84 is recessed to receive a rubber or the like valve 86 which is seated to seal off communication between the bore 82 and the first chamber 38. A plurality of axially extending grooves 87 are formed in the periphery of support 84 to provide a by-pass for conducting fluid past the support. The right end of passage 58 is threaded to receive an adjusting plug 89 which is apertured to interconnect bore 82 and passage 58. A graduating spring 92 is interposed between the right end of plug 89 and valve support 84, said support 84 having a socket 91 adapted to receive the end of spring 92.

One requirement in the design of this pressure-limiting means is that it must be quick acting; that is, it must respond to pressure in such a manner as to be capable of maintaining a substantially constant maximum pressure in chamber 38. In achieving this quick-acting characteristic, rubber valve 86 is adapted to act against a conically tapered valve seat 88 which extends, with its pointed portion axially outwardly, from the valve seat insert 90 which is centrally apertured and secured in alignment with the bore 82. The valve 86 is formed of rubber having deformation characteristics which enable it to conform to the tapered surface of seat 88 thereby conducing to the aforementioned rapid controlling action.

It should be understood at this point, that valve 86 controls communication between the two chambers 38 and 54, hence communication between chamber 38 and the low pressure reservoir 24.

This pressure-limiting device 81 is so designed that when the hydraulic pressure in chamber 38 exceeds a predetermined value, for example 1200 lbs. per square inch, the spring 92 which biases the valve 84 to closed position will be compressed allowing valve 86 to be spaced from its seat 88. Communication is thereby established between chamber 38 and the reservoir 24 for bleeding off the excessive pressure developed in chamber 38. When this pressure has lowered a predetermined amount, the pressure-limiting device 81 recovers and valve 86 severs this communication. By making the valve 86 of relatively soft rubber which readily deforms to fit the contour of the protruding conical seat 88 relatively close control of the amount of pressure reduction in chamber 38 can be achieved, and in practice, where the subject invention is used in a brake system wherein relatively high hydraulic pressures in the neighborhood of 1200 to 1500 lbs. per square inch are used, it is possible to maintain a working pressure in chamber 38 which does not deviate more than 50 lbs. from a standard pressure of 1200 lbs. per square inch.

This closely controlled pressure is communicated to the brakes by means of a port 94 formed in casing 31, which is connected to a conduit 28 leading to the brakes.

It is to be understood that the diameters of the stepped portions of piston 56 and of the effective areas of the ends of piston 37 must be so related as to provide the desired boost or assistive effect, because if the proper proportions between these various diameters are not maintained, the device may be uncontrollable and therefore unusable for braking purposes. The design of these various pistons, and especially of their effective pressure surfaces is fully explained in Stryker Patent No. 2,569,028, and this explanation is hereby made a part of this specification insofar as applicable.

In normal operation, when it is desired to apply the brakes, the push rod 36 is advanced toward the left a distance sufficient to close valve 42 and to move the primary piston 37 to the left against the force of spring 46. Any pressure thereby developed in chamber 38 is driven through port 94 to the brakes 30, and in the preferred embodiment, a pressure of sufficient intensity may be developed in chamber 38 for taking up any running clearances in the brake 30 before the device 12 is actuated. Assuming the predetermined pressure to now be developed in chamber 38, further movement of rod 36 toward the left will further displace piston 37 and cause a higher pressure to be developed in chamber 38. This pressure acts against the small diameter end of piston 56 which, if of sufficient magnitude, will move piston 56 against the load of spring 64. Movement of piston 56 to the left is first effective to close off passage 58 by engagement with valve 67, and further movement to the left is effective to unseat valve 70 thereby opening fluid-conducting passage 68.

At this point, high pressure from the accumulator 16 is conducted through port 74, fluid-conducting passage 68, chamber 80, passage 78, and into chamber 40 behind primary piston 37. This pressure also acts, as explained previously, against the large diameter end 62 of piston 56, and tends to drive it to the right.

The pressure communicated to chamber 40 acts against the rear surface of piston 37 tending to drive it to the left and to develop additional pressure in chamber 38. Thus it is seen, that the pressure prevailing in chamber 40 actually assists the operator in moving control rod 36 to the left.

If it were not for the fact that the diameters or areas of piston 56 and piston 37 were in proper proportion, the result would be an uncontrollable surging of primary piston 37 to the left on its pressure-developing stroke. This of course is not desirable in a braking system, since it is necessary for the operator to have absolute control over the degree of application of his brakes.

Therefore, with the diameter of the stepped portions of piston 56 suitably sized, an incremental brake applying movement of rod 36 will result in the generation of a certain pressure in chamber 38, and this pressure acts against the small diameter end of piston 56. Thus, when the accumulator pressure enters chamber 80 and acts against the large diameter surface 62 of piston 56, this piston 56 will be driven to the right until valve 70 just closes fluid-conducting passage 68. This action severs further pressure communication to chamber 40 and thus stops the progressive pressure-developing movement of piston 37. An operating force on rod 36 is necessary if this incremental braking effect is to be maintained and if more braking effort is needed, it is only necessary to operate rod 36 as explained previously.

Weight of structural parts of brakes intended for use on aircraft is of primary importance to the aircraft designer. Thus, in sacrificing weight in certain instances strength of the various parts is sacrificed. In certain aircraft brakes now being used today, the hydraulic motor parts of the brakes have been designed to accept only a maximum of approximately 1300 lbs. per square inch and if this value is exceeded, obviously the parts will fail. By the use of this invention, it is seen that if the pressure being communicated to the brakes should exceed 1200 lbs. the pressure-limiting valve 81 will respond to bleed off, for example, 50 lbs. of this pressure, dropping the effective maximum brake-applying value to 1150 lbs. Thus, an effective means for controlling the pressures communicated to the brakes is presented, and it is of further interest to note that while the various diameters of the pistons must be so proportioned as to prevent a surging condition, if something unexpected should occur to cause surging, the pressure-limiting device would act to prevent surging to values which would cause damage to the brake system parts.

Although only one embodiment of the invention has been illustrated and described, various changes in the form and relative arrangements of the parts may be made to suit requirements.

I claim:

1. A fluid pressure-controlling device adapted to be operatively connected to a fluid pressure motor, comprising a cylindrical casing having a uniform diameter bore in one end thereof and an outlet for said bore, a piston reciprocable in said bore and serving as a partition for first and second variable volume chambers, said piston having an aperture adapted to connect said chambers and a valve for controlling the opening and closing of said aperture, an operating rod reciprocally carried by said casing and having connection with said piston for operating same, a spring in the first chamber acting to force said piston in a direction to reduce the volume of the second chamber, a stepped diameter bore coaxially arranged at the end of said first chamber opposite the second chamber with the smaller diameter end opening into said first chamber, a stepped diameter piston reciprocably arranged in said stepped bore with the small diameter end being exposed to said first chamber, a coaxial passage in said stepped piston, an exhaust port in said casing arranged to communicate with said coaxial passage, a conduit connecting a third chamber adjacent the large diameter end to said second chamber, a valve reciprocably carried by said casing and arranged to control communication between said coaxial passage and said third chamber, a pressure inlet port having communication with said third chamber, means controlling communication between said inlet port and said third chamber including a connection to said last mentioned valve, and a pressure-limiting means carried in the small diameter end of said stepped piston and comprising a bore communicating with said exhaust port and said first chamber, a valve seat provided in said bore, and a quick-acting rubber valve biased onto said seat to normally sever the communication between said exhaust port and said first chamber, said rubber valve opening only upon the exertion thereagainst by a predetermined fluid pressure prevailing in said first chamber.

2. A fluid pressure-controlling device adapted to be operatively connected to a fluid pressure motor, comprising a cylindrical casing having a uniform diameter bore in one end thereof and an outlet for said bore, a piston reciprocable in said bore and serving as a partition for first and second variable volume chambers, an operating rod reciprocably carried by said casing and having connection with said piston for operating same, a spring in the first chamber acting to force said piston in a direction to reduce the volume of the second chamber, a stepped diameter bore coaxially arranged at the end of said first chamber opposite the second chamber with the smaller diameter end opening into said first chamber, a stepped diameter piston reciprocably arranged in said stepped bore with the smaller diameter end being exposed to said first chamber, a coaxial passage in said stepped piston, an exhaust port in said casing arranged to communicate with said coaxial passage, a conduit connecting a third chamber adjacent the larger diameter end to said second chamber, a valve reciprocably carried by said casing and arranged to control communication between said coaxial passage and said third chamber, a pressure inlet port having communication with said third chamber, means controlling communication between said inlet port and said third chamber including a connection to said last mentioned valve, and a pressure-limiting means carried in the smaller diameter end of said stepped piston and comprising a bore communicating with said exhaust port and said first chamber, a valve seat provided in said bore, and a quick-acting rubber valve biased onto said seat to normally sever the communication between said exhaust port and said first chamber, said rubber valve opening only upon the exertion thereagainst by a predetermined fluid pressure prevailing in said first chamber.

3. A fluid pressure-controlling device adapted to be operatively connected to a fluid pressure motor, comprising a cylindrical casing having a uniform diameter bore in one end thereof and an outlet for said bore, a piston reciprocable in said bore and serving as a partition for first and second variable volume chambers, an operating rod reciprocably carried by said casing and having connection with said piston for operating same, a stepped diameter bore coaxially arranged at the end of said first chamber opposite the second chamber with the smaller diameter end opening into said first chamber, a stepped diameter piston reciprocably arranged in said stepped bore with the smaller diameter end being exposed to said first chamber, a coaxial passage in said stepped piston, an exhaust port in said casing arranged to communicate with said coaxial passage, a conduit connecting a third chamber adjacent the larger diameter end to said second chamber, a valve reciprocably carried by said casing and arranged to control communication between said coaxial passage and said third chamber, a pressure inlet port having communication with said third chamber, means controlling communication between said inlet port and said third chamber including a connection to said last mentioned valve, and a pressure-limiting means carried in the smaller diameter end of said stepped piston and comprising a passage communicating with said exhaust port and said first chamber, a valve seat provided in said bore, and a quick-acting rubber valve biased onto said seat to normally sever the communication between said exhaust port and said first chamber, said rubber valve opening only upon the exertion thereagainst by a predetermined fluid pressure prevailing in said first chamber.

4. A fluid pressure-controlling device comprising a first fluid pressure responsive member which separates first and second variable volume chambers, a second fluid pressure responsive member having opposite end faces of different diameters, the smaller diameter face being in communication with the first chamber, means connecting a third chamber communicating with the larger diameter face of said second fluid pressure responsive member with said second chamber, valve means responsive to movement of said second fluid pressure responsive member to control the admission of fluid pressure to said third chamber, and pressure-limiting means carried by said second fluid pressure responsive member and comprising an outlet, a valve element controlling said outlet, said valve element serving to control communication between said outlet and said first chamber and opening only when the pressure in said first chamber attains a predetermined value.

ALTON B. MILLER.

References Cited in the file of this patent

UNITED STATES PATENTS

| Number | Name | Date |
|---|---|---|
| 2,472,695 | Chouings | June 7, 1949 |
| 2,569,028 | Stryker | Sept. 25, 1951 |